Figure 1:
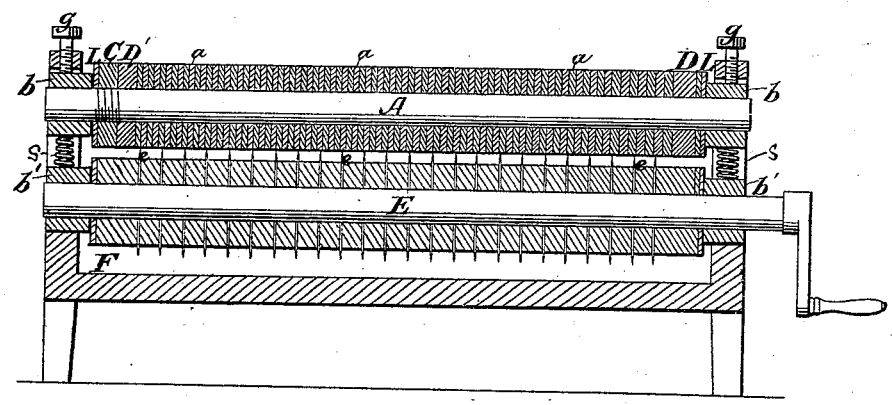
Figure 2:
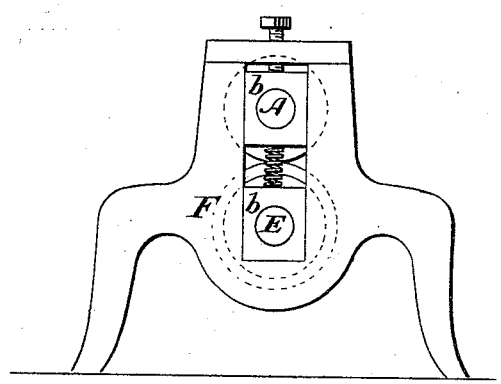

J. H. GARDINER.
Machines for Cutting Welts.

No. 148,203.            Patented March 3, 1874.

WITNESSES            INVENTOR
           By         J. H. Gardiner
                                         his Attorneys.

AM. PHOTO-LITHOGRAPHIC CO. N.Y. (OSBORNE'S PROCESS.)

UNITED STATES PATENT OFFICE.

JAMES H. GARDINER, OF WORCESTER, MASSACHUSETTS, ASSIGNOR OF ONE-HALF HIS RIGHT TO WILLIAM R. ALBERTSON, OF SAME PLACE.

IMPROVEMENT IN MACHINES FOR CUTTING WELTS.

Specification forming part of Letters Patent No. 148,203, dated March 3, 1874; application filed December 19, 1873.

*To all whom it may concern:*

Be it known that I, JAMES H. GARDINER, of Worcester, in the county of Worcester and State of Massachusetts, have invented a new and Improved Machine for Cutting Welts, &c.; and I do hereby declare the following to be a full and exact description of the same, reference being had to the accompanying drawing forming part of this specification, in which my invention is represented by a side elevation.

Similar letters of reference in the accompanying drawing denote the same parts.

The object of this invention is to improve the construction and operation of machines for cutting welts, boot-straps, and other similar articles; and the invention consists, first, in the combination of a series of circular knives arranged on a rotary shaft, and a series of circular disks of rawhide, arranged in juxtaposition on another rotating shaft, the latter being longitudinally adjustable in its bearings by means of disks or washers, which may be shifted from end to end of the shaft, by means of which adjustment of the shaft new bearing-surfaces for the cutters on the rawhide disks may be obtained.

In the drawing, F is a suitable supporting-frame, provided with boxes $b\ b'$, for the support of two shafts, A E, either of which shafts may be driven by a crank or other convenient means. Upon one of the shafts, A, and between two metallic disks, D D', one fixed, and the other movable, are placed a number of circular rawhide disks $a\ a\ a$, which are held firmly compressed together by means of the screw-nut C, operating against the movable plate or disk D'. This shaft A, with the rawhide disks, which it supports, is longitudinally adjustable to the extent of the thickness of one of the rawhide disks by means of several thin disks or washers, L L, which may be shifted from end to end of the shaft. On the other shaft are mounted a series of circular knives, $e\ e$, which are held in contact with the rawhide disks $a\ a$ by means of the screws $g\ g$, passing through screw-threaded perforations in the adjustable boxes $b\ b$, and then into screw-threaded perforations in the boxes $b\ b'$ of the shaft E, the shanks of the adjusting-screws $g\ g$ being surrounded by springs S S to give a yielding bearing to the cutters on the rawhide disks. The disks $a\ a$ and cutters $e\ e$ are thus held so firmly in contact with each other that the rotation of one of the shafts is sufficient to insure that of its companion without the necessity for connecting-gearing.

The leather, cloth, or other material to be cut is passed between the two shafts, and is cut by the knives operating against the rawhide disks.

The advantage of my improved machine over those heretofore in public use arises from the adjustability of the disks, by which, as they are cut away, all parts of their convex surface can be successively brought under the knives, and utilized for the purpose required. It is obvious that the same result would be produced by adjusting the disks on their shaft by adjusting the knives or knife-shaft, instead of the disks or disk-shaft, by using other and equivalent means of adjustment of said knives, disks, or shafts longitudinally. Hence I regard all such as being mere modifications of my devices, and falling within the principle of my invention.

I claim as my invention—

1. In a machine for cutting welts or other similar articles, the combination of a longitudinally-adjustable shaft, provided with rawhide disks, and a shaft provided with rotary cutters, the shaft carrying the rawhide disks being adjustable longitudinally to present a new bearing-surface for the cutters, substantially as described, and for the purpose set forth.

2. The adjustable shaft A, provided with the rawhide disks $a\ a$ and end washers L L, in combination with the shaft E, carrying the rotary cutters $e\ e$, substantially as described, and for the purpose set forth.

JAMES H. GARDINER.

Witnesses:
JOSEPH A. TITUS,
M. C. VIALL.